Aug. 6, 1935.  E. G. SIMPSON  2,010,568
COWL VENTILATOR
Filed March 8, 1934    2 Sheets-Sheet 1
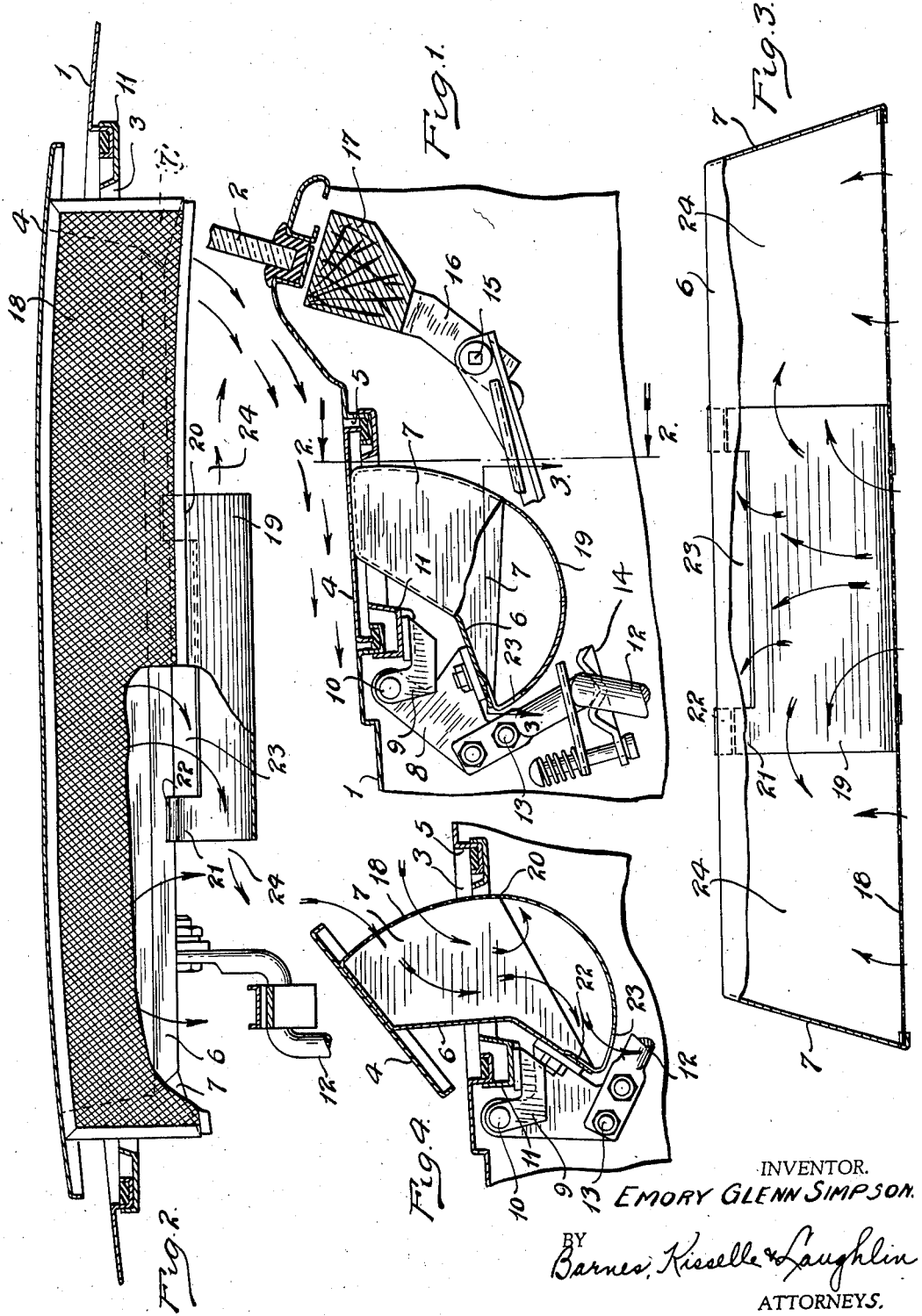
INVENTOR.
EMORY GLENN SIMPSON.
BY Barnes, Kisselle & Laughlin
ATTORNEYS.

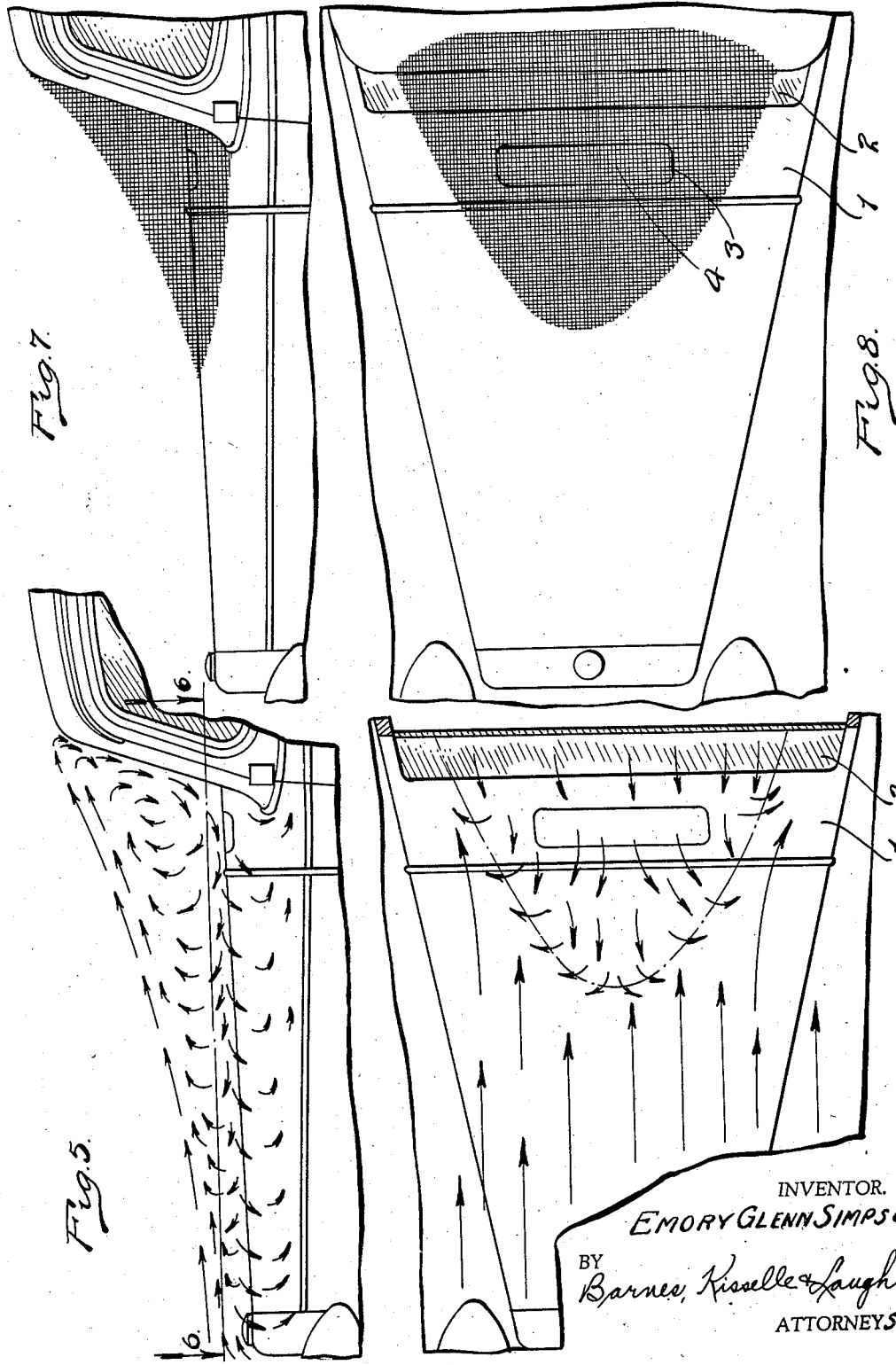

Patented Aug. 6, 1935

2,010,568

UNITED STATES PATENT OFFICE 2,010,568

COWL VENTILATOR

Emory Glenn Simpson, Detroit, Mich., assignor to General Motors Corporation, Detroit, Mich., a corporation of Delaware Application March 8, 1934, Serial No. 714,543

5 Claims. (Cl. 98—2)

This invention relates to a cowl ventilator for an automotive vehicle.

It is an object of this invention to produce a cowl ventilator that is highly efficient and will deflect a much larger amount of air into the body for a given size opening than the type of cowl ventilator now in use which has its closure hinged at the rear so that it opens with the opening toward the front of the vehicle. This object has been achieved by hinging the closure for the ventilating opening so that it swings about the front edge and thus when the closure is open the opening is presented toward the windshield or the rear of the vehicle. It has been found that in actual operation that with a closure hinged to swing about the forward lateral edge that the amount of air for a given size opening flowing into the vehicle will be approximately double. This result is due to the fact that the circulation of air tends to be downwardly along the conventional angled windshield and then forwardly along the cowl. This tendency has been observed and noted at certain speed ranges of the test automobile. This result is also due to the fact that the air pressures reach a maximum at a point or area close to the juncture of the windshield and the cowl. It is, of course, appreciated that the circulation and pressure of the air will vary with the direction of the wind and the speed of the car.

It is a further object of this invention to produce a cowl ventilator that will divide the inflowing air into two streams so that both the driver and the passenger in the front seat will receive the benefit of the blast of air that flows in through the opening in the cowl.

In the drawings:

Fig. 1 is a fragmentary longitudinal section through the cowl ventilator and windshield of an automotive vehicle body.

Fig. 2 is a section along the line 2—2 of Fig. 1 with the closure partially opened.

Fig. 3 is a section along the line 3—3 of Fig. 1.

Fig. 4 is a fragmentary section through the closure and baffle arrangement in open position.

Fig. 5 is a side elevation showing the direction of the circulating air currents in the area in front of the windshield and above the cowl and hood of an automobile.

Fig. 6 is a view along the line 6—6 of Fig. 5.

Fig. 7 is a side elevation and

Fig. 8 is a top view showing the air pressures in front of the windshield and above the cowl and hood of an automobile.

Referring more particularly to the drawings there is shown a portion of the cowl 1 of a vehicle body having an inclined windshield 2. The cowl is provided with ventilating opening 3 which is arranged to be closed by the closure 4.

It is desirable that the ventilating opening 3 which extends laterally of the cowl should be located adjacent the inclined windshield 2 and centrally of the cowl. The desirability of locating the ventilating opening 3 adjacent the inclined windshield 2 and centrally of or in the middle of the top portion of the cowl is explained in Figures 5 through 8. This desirability arises from two factors, the first of which is, as brought out in Figures 5 and 6, that the circulating air currents tend to travel downwardly along the inclined windshield and then forwardly along the top of the cowl and the hood, and the second of which is, as brought out in Figures 7 and 8, that the windshield tends to build up in front of it a positive air pressure which is greatest at the juncture of the windshield and the top portion of the cowl and which gradually tapers off along the sides forwardly of the windshield above the cowl and hood to form its own stream lining. The windshield builds up its own natural aero-dynamic stream lining. Hence, by locating the opening 3, as above explained, the opening is positioned in the highest pressure area and when the closure is opened toward the windshield it serves as a baffle for deflecting the air currents moving forwardly from the windshield along the top portion of the cowl through the opening 3 into the vehicle body. In the example shown, which has proved very satisfactory in operation, the windshield is inclined about 20° from the vertical and the opening 3 is positioned forwardly of the windshield 2 so that the rear transverse edge 5 of the opening is approximately three and one-half inches from the bottom edge of the windshield. The opening 3 is about three and one-half inches across when measured from its front to its rear edge. It is, of course, appreciated that these dimensions can be varied but the opening through the cowl should be adjacent the maximum pressure area within the forward flowing air stream and still not be so close to the foot of the windshield that the opening will be restricted when the closure 4 is raised.

The closure 4 has fixed to its under face the angular depending baffle plate 6 having the closed ends 7. The closure 4 is arranged to be swung about its forward edge and as used herein this means that the closure is pivoted about an axis extending laterally of the body and forwardly of the rear edge so that when open the closure will be inclined upwardly from its front to its rear edge to present an opening to the rear or toward the windshield. To this end baffle 6 has fixed thereto the hinge plate 8 which is pivotally supported on the other hinge plate 9 by the pin 10. The plate 9 is fixed to the underside of the trough 11 which extends around the periphery of the opening 3. An operating handle 12 is fixed to the hinge plate 8 in any suitable manner as by the bolts 13. The handle 12 in turn is associated with an adjuster 14 pivoted as at 15 to a bracket 16 secured to the under face of the cowl bar 17. The adjuster 14 cooperates with the handle 12 to hold the closure 4 in its closed and several open positions.

The baffle 6 extends across the underside of the closure 4 from one side of the opening 3 to the other. An arcuate screen 18 is fixed to the under face of the closure 4 and extends downwardly beneath the cowl when the closure is in closed position. The screen 18 is secured at each end to the end pieces 7. An air stream deflector for spreading the inflowing stream of air in the form of a curved plate 19 is secured along its rear edge as at 20 to the bottom edge of the screen 18. The plate 19 is provided at each end of its rear edge with the straps 21 which are fixed to the lower edge of the baffle 6 as at 22. The curved baffle 19 being fixed to the bottom edge of the screen 18 also serves as a stiffener and thereby prevents the screen from rattling. The straps 21 are spaced and thus provide a small narrow opening 23 between the lower edge of the baffle 6 and the forward edge of the plate 19. The plate 19 extends laterally from the center of the opening 3 roughly half way to the ends 7 thus leaving an opening 24 at each side. The width of the baffle 19 may be varied to in turn determine the desired size of the opening 24.

In operation when the vehicle is in motion in relatively still air the air tends to flow downwardly from top toward the bottom of the inclined windshield 2, as indicated by the arrows Figure 1, and then forwardly along the top of the cowl 1. When the closure 4 is swung upwardly to any such open position as that shown in Figures 2 and 4, the forwardly flowing stream of air strikes the depending baffle 6 and also 19 and part of the air is deflected downwardly through the opening 23 as indicated by the arrows. The air which flows outwardly along each end of the baffle 6 and 19 passes outwardly and downwardly through the openings 24 in two distinct streams of air, one of which strikes the feet of the driver and the other the feet of the passenger. The air which is deflected downwardly by the baffle 6 between the ends of the divider plate 19 strikes the upper face of the deflector plate 19 where it piles up and spills over the sides of the deflector plate 19 and then downwardly through the openings 24. A small portion of the air is deflected downwardly by the baffle 6 through the opening 23 to the foot board.

It is found that with this type of cowl ventilator assembly that a greater volume of air for a given size opening in the cowl is obtained by swinging the closure about its rear edge so that it presents an opening to the inclined windshield in conjunction with the depending baffle for directing the forwardly flowing stream of air through the opening than is possible with the type of ventilator having the closure swingable along its rear edge. Further, with this type of stream deflector part of the stream of air deflected through the opening 3 is divided into two substantially equal streams, one on each side of the center of the vehicle and directed downwardly upon the feet of the passenger as well as the driver.

I claim:

1. In an automotive vehicle body having a cowl and a windshield positioned along the rear edge of the cowl, a ventilating opening through the said cowl adjacent the lower edge of the windshield, a closure for the said opening swingable about its forward edge to provide an opening between its rear edge and the cowl, a baffle depending from the under face of the closure, and a second baffle positioned within the body beneath the opening, the said second baffle being narrower than the said opening whereby part of the stream of air deflected downwardly by the first baffle is split into two streams by the second baffle which pass into the body at each end of the second baffle.

2. In an automotive vehicle body having a cowl and an inclined windshield positioned along the rear edge of the cowl, a ventilating opening through the said cowl adjacent the lower edge of the windshield, a closure for the said opening swingable about its forward edge to provide an opening between its rear edge and the cowl, a baffle depending from the under face of the closure, and a second baffle positioned within the cowl beneath the opening in the cowl and extending forwardly of the body from adjacent the rear edge of the opening in the cowl toward the first mentioned depending baffle, the second baffle being of less width than the opening in the cowl whereby part of the stream of air flowing through the opening and deflected downwardly by the first mentioned baffle is split into two separate streams by the second baffle.

3. In an automotive vehicle body having a cowl and a windshield positioned along the rear edge of the cowl, a ventilating opening through the said cowl adjacent the said windshield, a closure for the said opening swingable about its forward edge to present an opening to the windshield, a baffle depending from the under face of the closure into the vehicle body, a second baffle extending rearwardly from the first baffle and positioned within the body beneath the opening in the cowl, the said second baffle being narrower than the opening in the cowl and swingable along with the depending baffle when the closure is swung to open and closed position whereby when the closure is open part of the stream of air deflected downwardly by the first baffle is split into two streams by the second baffle which pass into the body at each end of the second baffle.

4. In an automotive vehicle body having a cowl, a windshield positioned along the rear edge of the cowl, a ventilating opening through the said cowl adjacent the lower edge of the windshield, a closure for the said opening swingable about its front edge to provide an opening between its rear edge and the cowl, a baffle fixed to the under face of the closure and depending into the vehicle body, a second baffle fixed to the first baffle within the body beneath the opening in the cowl and extending rearwardly from the depending baffle, the said second baffle being narrower than the opening in the cowl and having its rear edge positioned beneath the rear edge of the opening in the cowl whereby when the closure is swung to open position the first and second baffle swing with the closure so that the rear edge of the second baffle approaches the rear edge of the opening in the cowl and the stream of air flowing through the opening is deflected downwardly by the first mentioned baffle and part of the stream split into two separate streams by the second baffle.

5. In an automotive vehicle body having a cowl and a windshield positioned along the rear edge of the cowl, a ventilating opening through the said cowl adjacent the lower edge of the windshield, a closure for the said opening swingable about its forward edge to provide an opening between its rear edge and the cowl, a baffle depending from the under face of the closure adjacent the front edge of the opening having closed ends extending along the sides of the opening in the cowl, a second baffle positioned within the body beneath the opening projecting rearwardly from the first baffle, the second baffle being narrower than the opening in the cowl and positioned between the closed ends of the first baffle whereby an opening is provided at each side between the second baffle and the closed ends of the first baffle so that part of the air deflected downwardly through the opening by the first baffle is split by the second baffle into two streams passing through the openings at each side of the second baffle.

EMORY GLENN SIMPSON.